May 25, 1948.     F. J. DALEY     2,442,322

ANTISKID DEVICE

Filed Jan. 29, 1945

Inventor:
Frank J. Daley,
by Adolph C. Hugin
His Attorney

Patented May 25, 1948

2,442,322

UNITED STATES PATENT OFFICE 2,442,322

ANTISKID DEVICE

Frank J. Daley, Schenectady, N. Y.

Application January 29, 1945, Serial No. 574,995

5 Claims. (Cl. 188—4)

My invention relates to antiskid devices which are particularly useful in connection with self-propelled road vehicles.

An object of my invention is to provide an improved antiskid or traction-increasing arrangement for vehicles which can be rendered effective or ineffective from within the vehicle and preferably from the operator's seat by a remote control device.

Another object of my invention is to provide an improved antiskid or traction-increasing arrangement for vehicles wherein the device is carried by the vehicle and can be made effective or ineffective for operation at a speed responsive to the speed of the vehicle wheels.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
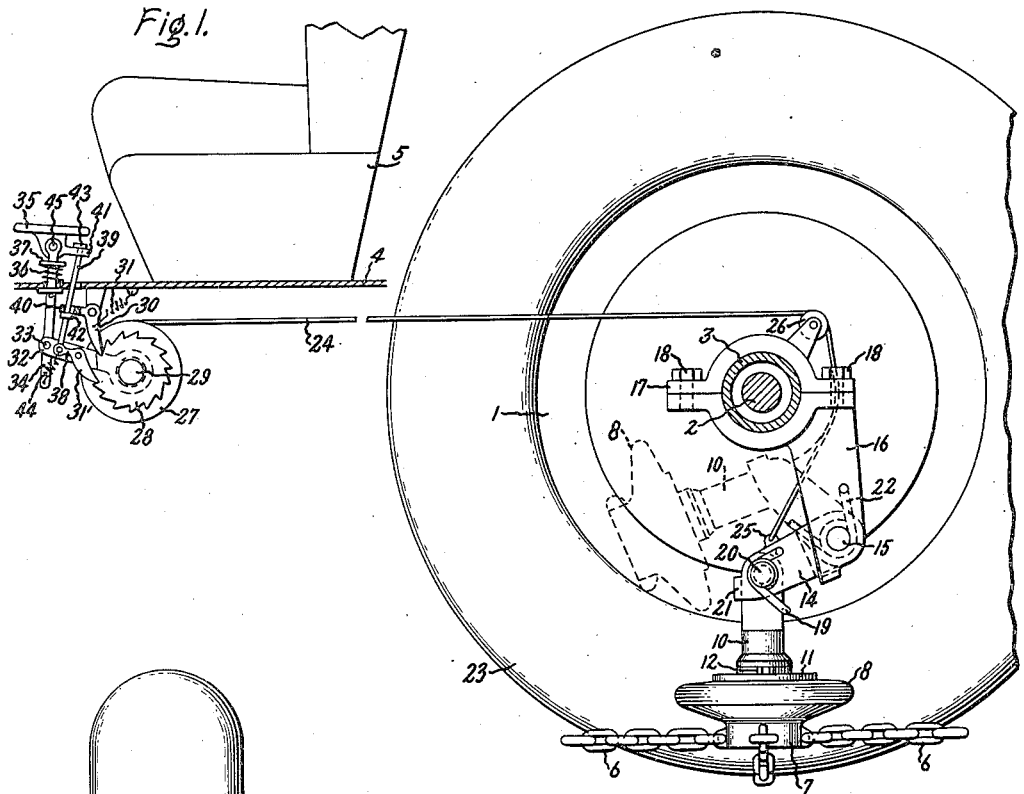
Figure 2:
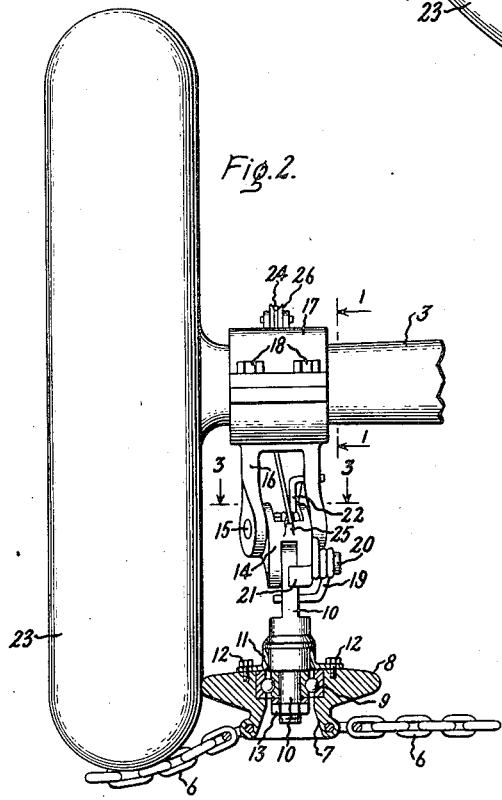
Figure 3:
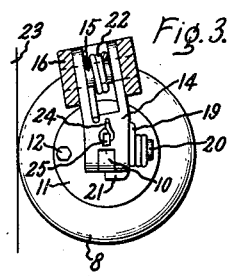

In the drawing, Fig. 1 is a fragmentary side elevational view of a vehicle showing an operator's seat and a rear driving wheel equipped with an embodiment of my improved antiskid device looking in the direction of line 1—1 in Fig. 2; Fig. 2 is an end elevational view of the wheel and antiskid device shown in Fig. 1 partly in section to illustrate the supporting construction of the device; and Fig. 3 is a view taken along line 3—3 of Fig. 2 showing the details of the mounting arrangement for the antiskid device shown in Figs. 1 and 2.

Referring to the drawing, I have shown a fragmentary view of a self-propelled vehicle, such as an automobile, provided with an embodiment of my improved antiskid device in which the vehicle is provided with traction wheels 1 which are mounted on a driving axle 2 arranged within an axle housing 3 which is suitably connected, as in any conventional machine, by a suitable spring rigging to a chassis which supports a vehicle frame including a floor 4 on which an operator's or driver's seat 5 is mounted. In the illustrated arrangement, a plurality of non-rigid traction-increasing chain members 6 are secured to a supporting hub 7 formed on a friction wheel contact member 8 which is rotatably supported by suitable antifriction ball bearings 9 mounted on the lower end of an arm 10 of a retractable supporting link. A cover 11 is arranged over the upper end of the bearing and is secured to the friction wheel member in any suitable manner, as by bolts 12, to facilitate removal of the friction wheel member for replacement or repairs of the traction chain members 6. The entire assembly of the friction contact wheel and the traction chain members can be readily removed from the supporting arm 10 by unscrewing a retaining bolt 13 which secures the bearing 9 in position on the arm 10. This assembly is supported by a vertically resiliently yieldable linkage which comprises two arms, including the arm 10, and another arm 14 which is pivotally supported by a pin 15 on a mounting member having a bifurcated arm 16 which projects downwardly towards the outer periphery of the wheel 1. This mounting member arm 16 is secured to the axle housing 3 adjacent the vehicle wheel 1 by a clamping element 17 which extends around the upper portion of the axle housing and is fastened to the mounting arm 16 by suitable bolts 18 for mounting the friction wheel contact member and the linkage adjacent the inner side of the vehicle wheel 1. In this construction, a coil spring 19 is mounted on an end of a pivot pin 20 which pivotally secures together the adjacent ends of the linkage arms 10 and 14 and biases the friction contact wheel member 8 outwardly towards a projecting stop 21 formed on the adjacent end of the linkage arm 14, but permits the assembly, including the friction contact wheel member 8 and the linkage arm 10, to swing backwards against the biasing pressure of the spring 19 if this assembly comes in contact with an obstruction in the road surface or if the wheel sinks in a depression in the road surface and these elements come in contact with higher material on the side of the wheel, thereby preventing damage to the mechanism. Furthermore, this relative vertical movement of the friction wheel 8 is accomplished without substantial movement thereof transversely of the vehicle wheel, thereby providing for this movement with the least possible pull on the chains 6 which may be under the wheel, resulting in the minimum stress on these members during such action. The upper linkage arm 14 is biased downwardly by a coil spring 22 which is arranged about the pivot pin 15 between the bifurcated upper end of the linkage arm 14 and normally biases the arm 14 and, therefore, the assembly of the linkage arm 10 and the friction contact wheel member 8, together with the chain elements 6, downwardly into operative position with the outer peripheral surface of the friction contact wheel 8 in frictional contact with the side walls of the wheel 1 or a tire 23 on the wheel 1, as is more clearly shown in Figs. 2 and 3. This is the position of the device as shown in solid lines in Fig. 1 and also shown in Fig. 2, in which rotation of the wheel 1 causes the friction contact wheel 8 to operate at a speed responsive to the speed of the wheel 1 due to the frictional engagement between the contacting surfaces of these two members, such that the non-rigid traction chain members 6 are extended outwardly by centrifugal force and are placed sequentially substantially under the vehicle wheel. Thus, when the vehicle wheels turn and the vehicle tends to move forward, these traction members are placed in operative engaging positions at a speed corresponding to the speed of rotation of the wheel, thereby providing a traction-increasing arrangement which varies directly with the speed of operation of the wheels which tends to minimize spinning of the wheels. The outer periphery of the contact wheel 8 is rounded as shown in Fig. 2 and may also be made of a resilient material, such as rubber, to minimize any possible wear effects which this wheel may have on the side walls of the tire 22. However, since both of the contacting surfaces of the wheel 8 and the tire 22 rotate at substantially the same speed, there will be very little tendency for any resultant wear on either of these members. The arrangement of the double arm linkage and the two biasing springs further insures against damage to the device by contact with irregularities in the road surface by providing for the relative vertical yielding of the linkage as high as the position shown in dotted lines in Fig. 1 against the pressure of the biasing spring 21, thereby relieving any shock to the mechanism by this yieldable supporting arrangement.

In order to provide for a longer life and usefulness of the device, it is desirable that it should be retractable out of operative position with the friction contact wheel member 8 out of engagement with the vehicle wheel when the vehicle is operating on a dry or non-slippery surface. In addition, it is desirable that the device should be retractable to inoperative position by the operator of the vehicle without requiring the operator to leave his position in the driver's seat, such that the antiskid device can be retracted or can be applied from within the vehicle. This is obtained by providing a remote control device for retracting the linkage arms to inoperative position of the friction wheel member 8 out of engagement with the vehicle wheel and also for releasing the linkage arms to permit the biasing springs 19 and 22 to bias the linkage arms and the friction wheel member towards operative position in engagement with the vehicle wheel tire 23. This remote control device includes a cable 24 which is secured to an ear 25 on the linkage arm 14 and which passes over a pulley 26 mounted on the bracket member 17 and extends over a drum 27 to which the other end is secured. This drum 27 is mounted below the floor 4 adjacent the operator's seat 5 and is adapted to be operated by a ratchet and pawl mechanism which includes a ratchet 28 secured to the drum 27, both of which are mounted on a supporting shaft 29 mounted on the underside of the floor 4. The ratchet 28 is engaged by a latching release pawl 30 which is biased into engagement with the ratchet teeth by a spring 31 and normally prevents reverse rotation of the ratchet 28 and, therefore, of the drum 27. The ratchet is adapted to be turned in a counterclockwise direction, as seen in Fig. 1, by a second pawl 31', which is pivotally mounted on an arm 32 mounted for oscillation about the supporting shaft 29 and which is pivotally secured by a pin 33 to an operating rod 34 to which an operating foot pedal 35 is pivotally secured. This foot pedal 35 and the adjacent upper end of the rod 34 are arranged on the upper side of the floor 4 adjacent the front of the operator's feet and are biased upwardly by a spring 36 arranged in engagement with a collar 37 secured to the rod 34. The pawl 31' is provided with a finger 38 which is pivotally secured to a second operating rod 39 which extends through an opening in a finger 40 on the pawl 30 and also extends through an opening in a finger 41 formed on the foot pedal 35. This operating rod 39 is held in position between the finger 40 on the pawl 30 and the finger 41 on the foot pedal 35 by a collar 42 which normally engages the underside of the pawl finger 40 and a head 43 which normally engages the upper side of the foot pedal finger 41 and is biased into this position by a resilient coil spring 44 secured to the end of the operating rods 39 and 34.

With such an arrangement, if the antiskid device is in its operative position as shown in solid lines in Fig. 1, and it is considered desirable to retract it to its inoperative position, the foot pedal 35 is moved downwardly, such that the pawl 31' turns the ratchet 28 in a counterclockwise direction and winds the cable 24 around the drum 27, thereby retracting the linkage arm 14 to the position shown in dotted lines in this figure. In order to assure against interference between the antiskid device and the vehicle wheel when the device is in its inoperative position, the bifurcated ends of the mounting arm 16 are turned at an angle away from the adjacent side of the vehicle wheel, as shown in Figs. 2 and 3, and the adjacent end of the linkage arm 14 is also turned at an angle, as shown in these two figures, such that the axis of the pivot pin 15 is not parallel to the axis of the wheel supporting axle 2, but is arranged at an angle thereto, with the result that the friction contact wheel member 8 is moved away from the adjacent side of the wheel 1 as it is elevated to its retracted position by operation of the foot pedal 35. In order to retract fully the antiskid device, it may be necessary to move the pedal 35 up and down several times to wind up the cable 24 sufficiently for this retraction. However, when it is desired to apply the antiskid device, it is desirable that it should be applicable without delay in order to minimize possible danger from skidding of the vehicle on slippery surfaces. This is accomplished by turning the foot pedal 35 downwardly in front about its pivot pin 45 which secures it to the upper end of the operating rod 34, thereby raising the foot pedal finger 41 and raising the operating rod 39, together with the pawl finger 40 against the biasing action of the spring 31 and also raising the finger 38 of the pawl 31' so as to disengage both pawls 30 and 31' from the teeth of the ratchet 28. With this position of the pawls 30 and 31', the biasing springs 19 and 22 substantially instantaneously bias the supporting linkage arms 10 and 14 downwardly into operative position with the friction contact wheel member 8 in engagement with the side wall of the vehicle wheel tire 23 for placing the traction chain members 6 in operative position under the traction surface of the wheel tire 23.

In this manner, I provide a construction which is relatively simple and may be operable from the driver's seat while the vehicle is in motion or at rest and which can be applied substantially instantaneously when it is considered necessary or desirable and can be retracted out of operative position out of engagement with the vehicle wheel when this is considered desirable. The antiskid device also can be used without the retracting mechanism, but in most instances, it will be found more convenient to provide this mechanism to insure longer life to the device and also to provide for a quieter operation when the device is not required by road conditions.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. An antiskid device for a vehicle wheel including a plurality of non-rigid traction chain members, means for supporting said chain members, means including a friction wheel contact member for frictionally engaging a vehicle wheel to drive said traction chain members for sequentially placing said chain members substantially under the vehicle wheel at a speed responsive to the speed of operation of the vehicle wheel, means including a retractable linkage formed by a pair of pivotally connected arms for rotatably supporting said friction wheel member adjacent a vehicle wheel, and means including a coil spring for resiliently biasing said linkage arms downwardly toward operative position.

2. An antiskid device for a vehicle wheel including a plurality of non-rigid traction chain members, means for supporting said chain members, means including a friction wheel contact member for frictionally engaging a vehicle wheel to drive said traction chain members for sequentially placing said chain members substantially under the vehicle wheel at a speed responsive to the speed of operation of the vehicle wheel, means including a retractable linkage formed by a pair of pivotally connected arms for rotatably supporting said friction wheel member, means for resiliently biasing said linkage arms downwardly toward operative position, means for resiliently biasing said linkage arms to extended position towards operative position of said friction wheel member into engagement with the vehicle wheel, and means for mounting said linkage adjacent a wheel.

3. An antiskid device for a vehicle wheel including a plurality of non-rigid traction chain members, means for supporting said chain members, means including a friction wheel contact member for frictionally engaging a vehicle wheel to drive said traction chain members for sequentially placing said chain members substantially under the vehicle wheel at a speed responsive to the speed of operation of the vehicle wheel, means including a retractable linkage formed by a pair of pivotally connected arms for rotatably supporting said friction wheel member, means including a coil spring for resiliently biasing said linkage arms downwardly toward operative position, means including a second coil spring for resiliently biasing said linkage arms to extended position towards operative position of said friction wheel member into engagement with the vehicle wheel, and means for mounting said friction wheel member adjacent a wheel.

4. An antiskid device for a vehicle wheel including a plurality of non-rigid traction chain members, means for supporting said chain members, means including a friction wheel contact member for frictionally engaging a vehicle wheel to drive said supporting means for sequentially placing said chain members substantially under the vehicle wheel at a speed responsive to the speed of operation of the vehicle wheel, means including a retractable linkage formed by a pair of pivotally connected arms for rotatably supporting said friction wheel member, means for resiliently biasing said linkage arms downwardly toward operative position of said friction wheel member into engagement with the vehicle wheel, means for mounting said linkage adjacent a vehicle wheel, and means including a remote control device for retracting said linkage arms to inoperative position of said friction wheel member out of engagement with the vehicle wheel and for releasing said linkage arms for permitting the biasing of said linkage arms and said friction wheel member toward operative position.

5. An antiskid device for a vehicle wheel including a plurality of non-rigid traction chain members, means including a hub for supporting said chain members, means including a friction wheel contact member for frictionally engaging a vehicle wheel to drive said supporting hub for sequentially placing said chain members substantially under the vehicle wheel at a speed responsive to the speed of operation of the vehicle wheel, means including a retractable linkage formed by a pair of pivotally connected arms for rotatably supporting said friction wheel member, means including a coil spring for resiliently biasing said linkage arms downwardly toward operative position, means including a second coil spring for resiliently biasing said linkage arms to extended position towards operative position of said friction wheel member into engagement with the vehicle wheel, means including an arm for mounting said linkage on a vehicle axle adjacent a wheel, and means including a remote control device for retracting said linkage arms to inoperative position of said friction wheel member out of engagement with the vehicle wheel and for releasing said linkage arms for permitting the biasing of said linkage arms and said friction wheel member toward operative position by said resilient spring means.

FRANK J. DALEY.

REFERENCES CITED

The following references are of record in the file of this patent:

UNITED STATES PATENTS

| Number | Name | Date |
| --- | --- | --- |
| 1,223,070 | Putman | Apr. 17, 1917 |
| 1,236,499 | Thorne | Aug. 14, 1917 |
| 2,241,923 | Ridgway | May 13, 1941 |